United States Patent
Naruse et al.

(10) Patent No.: US 7,536,245 B2
(45) Date of Patent: May 19, 2009

(54) VEHICLE STATE ANALYZING SYSTEM, VEHICLE, AND VEHICLE STATE MANAGEMENT SYSTEM

(75) Inventors: Yutaka Naruse, Kodaira (JP); Shinichi Furuya, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/551,562

(22) PCT Filed: Apr. 1, 2004

(86) PCT No.: PCT/JP2004/004779

§ 371 (c)(1),
(2), (4) Date: Mar. 19, 2007

(87) PCT Pub. No.: WO2004/089664

PCT Pub. Date: Oct. 21, 2004

(65) Prior Publication Data

US 2007/0208472 A1 Sep. 6, 2007

(30) Foreign Application Priority Data

Apr. 1, 2003 (JP) ............................. 2003-097758

(51) Int. Cl.
*G06F 7/00* (2006.01)
(52) U.S. Cl. ............................. 701/36; 701/37; 701/65; 701/74; 180/197; 180/199

(58) Field of Classification Search ................... 701/35, 701/36, 37, 65, 74, 81; 180/197, 199
See application file for complete search history.

(56) References Cited

U.S. PATENT DOCUMENTS

| | | | | |
|---|---|---|---|---|
| 6,374,159 B1* | 4/2002 | Naruse et al. | ............... | 700/279 |
| 6,487,475 B1* | 11/2002 | Yoshikawa | ..................... | 701/1 |
| 2002/0087238 A1 | 7/2002 | Matsui | | |
| 2003/0000316 A1* | 1/2003 | Isono | .................... | 73/862.041 |

FOREIGN PATENT DOCUMENTS

| | | |
|---|---|---|
| JP | 7-223516 A | 8/1995 |
| JP | 2000-62639 A | 2/2000 |
| JP | 2000-318416 A | 11/2000 |
| JP | 2001-260619 A | 9/2001 |
| JP | 2002-82021 A | 3/2002 |
| JP | 2002-203065 A | 7/2002 |

* cited by examiner

*Primary Examiner*—Gertrude Arthur Jeanglaud
(74) *Attorney, Agent, or Firm*—Sughrue Mion, PLLC (57) ABSTRACT

A vehicle is provided with an optimum suspension/chassis state and run for a first period of time under a predetermined condition, for storing information related to outputs of force sensors, as a reference value. The state of the vehicle may change due to the use thereof, thus it is run for a second period of time under the predetermined condition. An analyzing apparatus analyzes a change of an alignment state of the vehicle on the basis of information stored from the first and second periods.

8 Claims, 6 Drawing Sheets

FIG. 5A
ONE-WHEEL INTERNAL PRESSURE REDUCED

Mo(B)=0.295

FIG. 5B
PROPER INTERNAL PRESSURE

VEHICLE STATE ANALYZING SYSTEM, VEHICLE, AND VEHICLE STATE MANAGEMENT SYSTEM

TECHNICAL FIELD

The present invention relates to a vehicle state analyzing system for analyzing the state of a vehicle, a vehicle provided with a vehicle state analyzing system, and a vehicle state management system for managing the state of a vehicle.

BACKGROUND ART

Modern vehicles (so-called automobiles) are provided with various apparatuses for detecting the state thereof, For example, as a low internal pressure alarm device for the tire, the direct type device which directly measures the internal pressure for issuing an alarm, and the indirect type device which detects a change in tire revolution speed resulting from a change in rolling radius due to a change in tire internal pressure for issuing an alarm have been developed.

However, the former uses radio wave for signal transmission to or from a revolving wheel, thus the power supply contained in the rotating element presents technical and durability problems, while the latter gives convenience including the device commonness to the ABS (anti-lock braking system), and the like, but any of the devices of this type has functions specified for the internal pressure of the tire, and is not a system which offers information including that about a change in running stability of the vehicle.

In addition, a system which is used in conjunction with the ABS, the TCS (traction control system), or the like, is difficult to accommodate a change when the tire is changed or when the characteristics of the suspension/chassis of the vehicle are changed, thus involving difficulties in adding the user's preference, such as a desired change of the tire, to the vehicle.

Although a contrivance for stabilizing the vehicle behavior by detecting the occurrence of a yaw moment in the vehicle, and combining the result with the braking of the wheels has been created, such a control falls in the category of control of a relatively large vehicle behavior, such as understeering or oversteering when turning, or the like, providing a mechanism which carries out control by detecting a change in yaw that is caused when the vehicle turning, and which primary object is to control after the occurrence of a yaw.

Further, a system which detects a change in a vehicle body acceleration to control the drive force distribution, and when the running stability of the vehicle is deteriorated, prevents such a phenomenon from proceeding, has been devised (TCS). Such a system is for stabilizing the attitude in cornering (for prevention of spinning, and the like), and is not for a technique in which, for the running stability in pseudo straight running within the minute steering angle region, which is frequently utilized in general running, with grasping a phenomenon of the source which causes a yaw to occur from the motion of the respective wheels, tendency thereof is monitored, or an alignment adjustment which causes the problem is related.

In addition, such a system aims at a control which covers a generated fluctuation in yaw and an occurred change in vehicle acceleration, on the presumption that the initial state of the vehicle varies from vehicle to vehicle. Thus, such a system does not reference to the initial state of the running stability of the vehicle for monitoring and maintaining it, and does not find a problem with a change in internal pressure, an alignment change, or the like.

In other words, the prior art has been only a measure against a phenomenon which has already occurred, and not an art which monitors the source for occurrence of a phenomenon to relate it to the necessity for repair or fault alarming.

Any vehicle can be checked for alignment by using an alignment tester, but the alignment tester cannot examine for fluctuation of the alignment of the vehicle in normal actual running.

In addition, no art has been available which, when the alignment has been changed due to some factor, such as a time dependent change (a change with passage of time), or the like, automatically adjusts the alignment such that the running stability of the vehicle is not deteriorated.

Further, a method is available which measures the magnitude of a lateral force by use of a platform tester, and adjusts the lateral force to be within the specified tolerance (reference range), but the method will not allow examining the fluctuation of the lateral force to the vehicle when the vehicle normal running.

The purpose of the present invention is to eliminate the drawbacks of the above-mentioned prior art, and to provide a vehicle state analyzing system, a vehicle, and a vehicle state management system which can grasp a problem of the state of a vehicle in normal running, such as the running stability related to the wheel mounting angle which depends on the characteristics of the tire, the time dependent change of the suspension/chassis or the change in adjustment of the suspension, the change in internal pressure of the tire, and the like.

DISCLOSURE OF THE INVENTION

A vehicle state analyzing method as stated in claim 1 comprises: a suspension/chassis setting step for setting an optimum suspension/chassis for a vehicle; a first measuring step for measuring fluctuation or fluctuation rate of a lateral force in the vehicle which is set; a second measuring step for measuring fluctuation or fluctuation rate of lateral force in the vehicle thereafter; and a comparing and computing step for comparing and computing of the measured value obtained at the first measuring step and the measured value obtained at the second measuring step.

Next, the operation the vehicle state analyzing method as stated in claim 1 will be described.

The running stability of a vehicle is determined by balance of fluctuation of force inputted to the suspension/chassis through the tire.

However, these fluctuation of force depends upon the distribution of the load caused by the state of the suspension/chassis of the vehicle and the vehicle body, the tolerance (error) for mounting position of the suspension, mounting of the wheel, construction of the tire, and the dispersion as an industrial product.

Therefore, the running stability can be managed by monitoring and analyzing, with the input from the road surface which is optimal for each vehicle as being a reference value, the disparate from the current situation.

With the vehicle state analyzing method as stated in claim 1, the vehicle which is set to be an optimum suspension/chassis state is first run for a certain period of time under a predetermined condition, such as the straight running, or the like, to measure the fluctuation or fluctuation rate of the lateral force in the vehicle (the first measuring step).

The state of the vehicle may change, depending upon the use thereof, thus after having been run or used to some extent, the vehicle is run under the predetermined condition in the same manner as at the previous time to measure the fluctuation or fluctuation rate of the lateral force in the vehicle (the second measuring step).

Then, by comparing and computing the measured value obtained at the first measuring step and the measured value obtained at the second measuring step (the comparing and computing step), the state of the vehicle can be analyzed.

For example, when the toe angle, the camber angle, the internal pressure for the tire, or the like, is changed in the vehicle, the inputs of forces from the wheels to the vehicle body are changed.

Therefore, according to this vehicle state analyzing method, a change from an optimum suspension/chassis state that is caused by a change in state of the vehicle, such as that in toe angle, camber angle, internal pressure for tire, or the like, can be grasped.

As described above, according to the vehicle state analyzing method as stated in claim 1, an effect that the problem of the running stability related to the wheel mounting angle which depends on the characteristics of the tire, the time dependent change of the suspension/chassis or the adjustment change of the suspension, the change in internal pressure of the tire, and the like can be grasped, is obtained.

In the invention as stated in claim 2 according to the vehicle state analyzing method of claim 1, the fluctuation or the fluctuation rate of the lateral force is measured when normal running of the vehicle.

Next, the operation of the vehicle state analyzing system as stated in claim 2 will be described.

With the vehicle state analyzing method as stated in claim 2, the fluctuation or fluctuation rate of the lateral force is measured in normal running of the vehicle. Therefore, the state of the vehicle in normal running can be known.

Herein, the phrase "when normal running" refers to a case where the user (the driver) runs on a general normal road surface with a vehicle, and different for a case in which where the vehicle runs on a test road surface on a platform tester, or the like.

The invention as stated in claim 3 is a vehicle state analyzing system for analyzing state of a vehicle having wheels, comprising: measuring means, provided in the vehicle, for measuring fluctuation or fluctuation rate of lateral force inputted to the vehicle through the wheel; and computing means for computing time dependent change of data measured by the measuring means.

Next, the operation of the vehicle state analyzing system as stated in claim 3 will be described.

With the vehicle state analyzing system as stated in claim 3, the measuring means provided in the vehicle measures the fluctuation or fluctuation rate of the lateral force inputted to the vehicle through the wheel, and the computing means computes the time dependent change of the data measured by the measuring means.

The invention as stated in claim 4 is a vehicle state analyzing system for analyzing state of a vehicle having wheels, comprising: a force sensor for detecting input of force from the wheel to the vehicle body; first memory means for storing information related to output of the force sensor when the vehicle which is set to be an optimum alignment state is run under a predetermined condition as a reference value; second memory means for storing information related to output of the force sensor when normal running of the vehicle; analyzing computation means for monitoring the output of the force sensor, and, on the basis of at least the information stored in the first memory means and the information stored in the second memory means, for analyzing the state of the vehicle; and information output means for outputting at least one of the information stored in the first memory means, the information stored in the second memory means, and the result of analysis obtained by the analyzing computation means.

Next, the operation of the vehicle state analyzing system as stated in claim 4 will be described.

With the vehicle state analyzing system as stated in claim 4, the vehicle which is set to be the optimum suspension/chassis state is first run for a certain period of time under a predetermined condition, such as the straight running, or the like, for storing the information related to the output of the force sensor in the first memory means as the reference value.

The state of the vehicle may change, depending upon the use thereof, thus it is run under the predetermined condition in the same manner as when the reference value has been stored as appropriate, for storing the information related to the output of the force sensor in the second memory means.

The analyzing computation means monitors the output of the force sensor, however, the term "monitors" herein includes not only grasping of the output information at any time (continuously) or every certain interval, but also unscheduled grasping.

Then, by the analyzing computation means, the state of the vehicle can be analyzed on the basis of the information stored in the first memory means and the information stored in the second memory means.

Herein, at least one of the information stored in the first memory means, the information stored in the second memory means, and the result of analysis obtained by the analyzing computation means can be outputted by the information output means, and these information and the result of analysis can be utilized when, for example, the state of the vehicle is to be reset to the optimum state.

For example, when the toe angle, the camber angle, the internal pressure for the tire, or the like, is changed in the vehicle, the input of force from the wheel to the vehicle body is changed.

Therefore, according to this vehicle state analyzing system, the change from the optimum suspension/chassis state which change is caused by the change in state of the vehicle, such as that in toe angle, camber angle, internal pressure for tire, or the like, can be grasped.

As described above, according to the vehicle state analyzing system as stated in claim 4, an effect that the problem of the running stability related to the wheel mounting angle which depends on the characteristics of the tire, the time dependent change of the suspension/chassis or the adjustment change of the suspension, the change in internal pressure of the tire, and the like can be grasped, is obtained.

In the invention as stated in claim 5 according to the vehicle state analyzing system of claim 4, the force sensor is provided in the vehicle, the first memory means, the second memory means, the analyzing computation means, and the information output means are provided outside the vehicle.

Next, the operation of the vehicle state analyzing system as stated in claim 5 will be described.

With the vehicle state analyzing system as stated in claim 5, only the force sensor is provided on the vehicle, thus the configuration on the vehicle side is simplified.

The invention as stated in claim 6 is a vehicle comprising: at least the force sensor of claim 4; and transmission means for transmitting the information obtained from the force sensor to the outside of the vehicle.

Next, the operation of the vehicle as stated in claim 6 will be described.

With the vehicle as stated in claim 6, the input of force from the wheel to the vehicle body can be detected by the force sensor, The information related to the output of the force sensor in normal running of the vehicle is transmitted to the outside of the vehicle, and can be analyzed outside the vehicle.

The invention as stated in claim 7 is a vehicle on which the vehicle state analyzing system of claim 4 is mounted.

Next, with the vehicle as stated in claim 7, the vehicle state analyzing system of claim 4 is mounted, thus the vehicle state can be analyzed on the vehicle side while the vehicle is running.

The invention as stated in claim 8 is a vehicle comprising: the vehicle state analyzing system of claim 4; and display means for displaying the state of the vehicle obtained by the analyzing computation means.

Next, the operation of the vehicle as stated in claim 8 will be described.

With the vehicle as stated in claim 8, the state of the vehicle analyzed by the analyzing computation means is displayed on the display means, and the state of the vehicle can be told to the driver, the manager of the vehicle, and the like. For example, in such a case as when the state of the vehicle is changed to worse state than the state which has been preset, attention can be inspired to the driver, the manager of the vehicle, and the like, by the display means.

Therefore, an effect that the driver can grasp, with the display means, the state of the vehicle analyzed by the analyzing computation means can be provided.

The invention as stated in claim 7 is a vehicle comprising: the vehicle state analyzing system of claim 4; and adjustment means for automatically adjusting alignment of a suspension on the basis of the state of the vehicle analyzed by the analyzing computation means.

Next, the operation of the vehicle as stated in claim 7 will be described.

With the vehicle as stated in claim 7, the adjustment means automatically adjusts the alignment of the suspension on the basis of the state of the vehicle analyzed by the analyzing computation means.

Therefore, the initial running performance of the vehicle that is rendered optimum can be maintained over a long period of time.

The invention as stated in claim 8 is a vehicle state management system comprising: the vehicle state analyzing system of claim 4; and a vehicle testing apparatus having a road surface for running which causes the wheels to be rotated, detecting the state of the vehicle from outside, and being capable of storing the state of the vehicle detected from the outside and the state of the vehicle analyzed by the vehicle state analyzing system.

Next, the operation of the vehicle state management system as stated in claim 8 will be described.

With the vehicle state management system as stated in claim 8, the vehicle testing apparatus can detect and store the state of the vehicle (such as alignment of the suspension, or the like) when turning of the wheel is stopped, and the state of the vehicle (such as the lateral force acting on the wheel, or the like) when the wheel is rotated on the road surface for running.

In addition, the vehicle testing apparatus can also store the state of the vehicle that has been analyzed by the vehicle state analyzing system.

Therefore, the vehicle testing apparatus can store and manage various pieces of information related to the running stability of the vehicle, and on the basis of these pieces of information, can adjust the vehicle to be the optimum state.

BEST MODE FOR CARRYING OUT THE INVENTION

First Embodiment

Hereinbelow, with reference to the drawings, an embodiment of the vehicle state analyzing system of the present invention will be described in detail.

Figure 1:
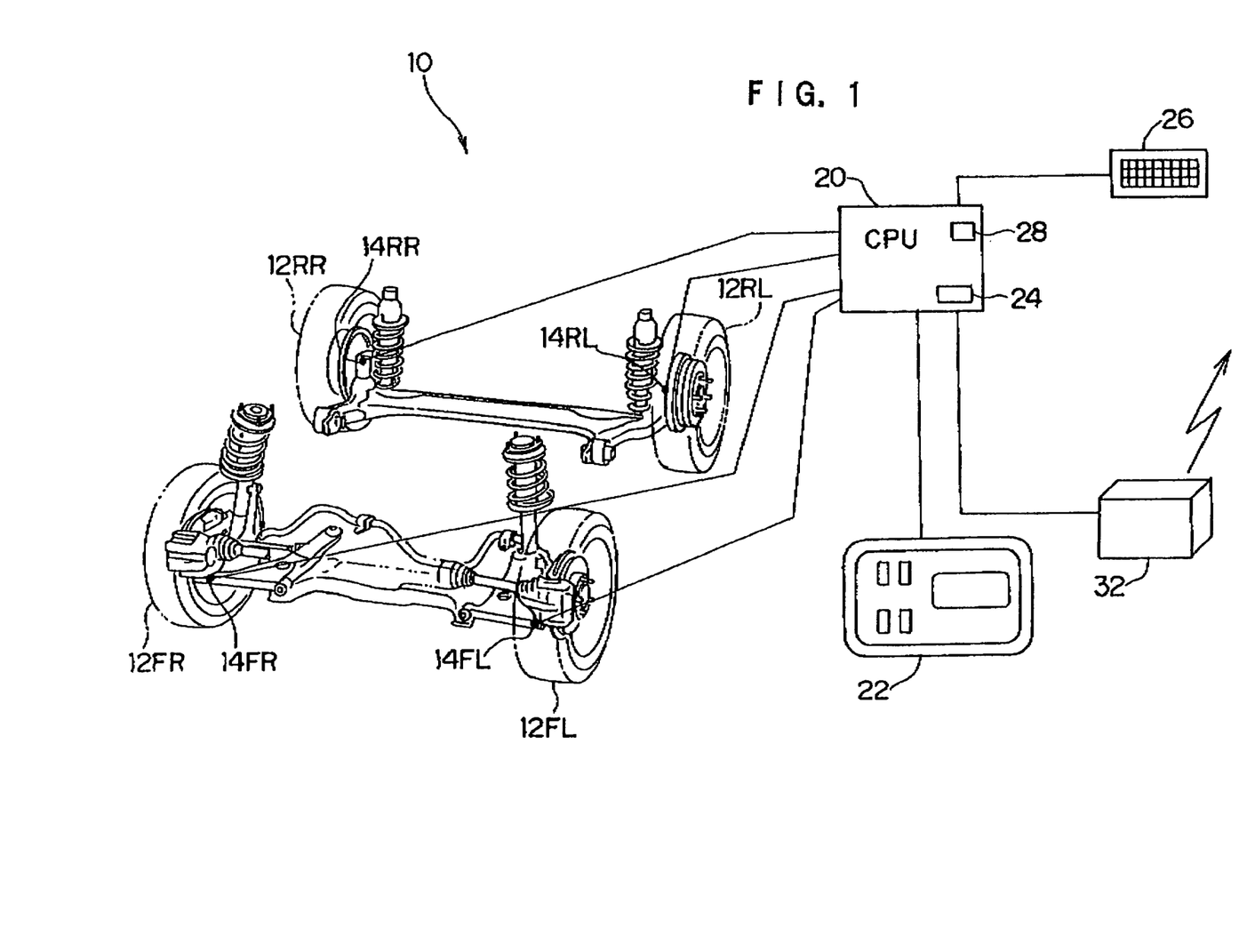
FIG. 1 is a configuration drawing of the system.
Figure 2:
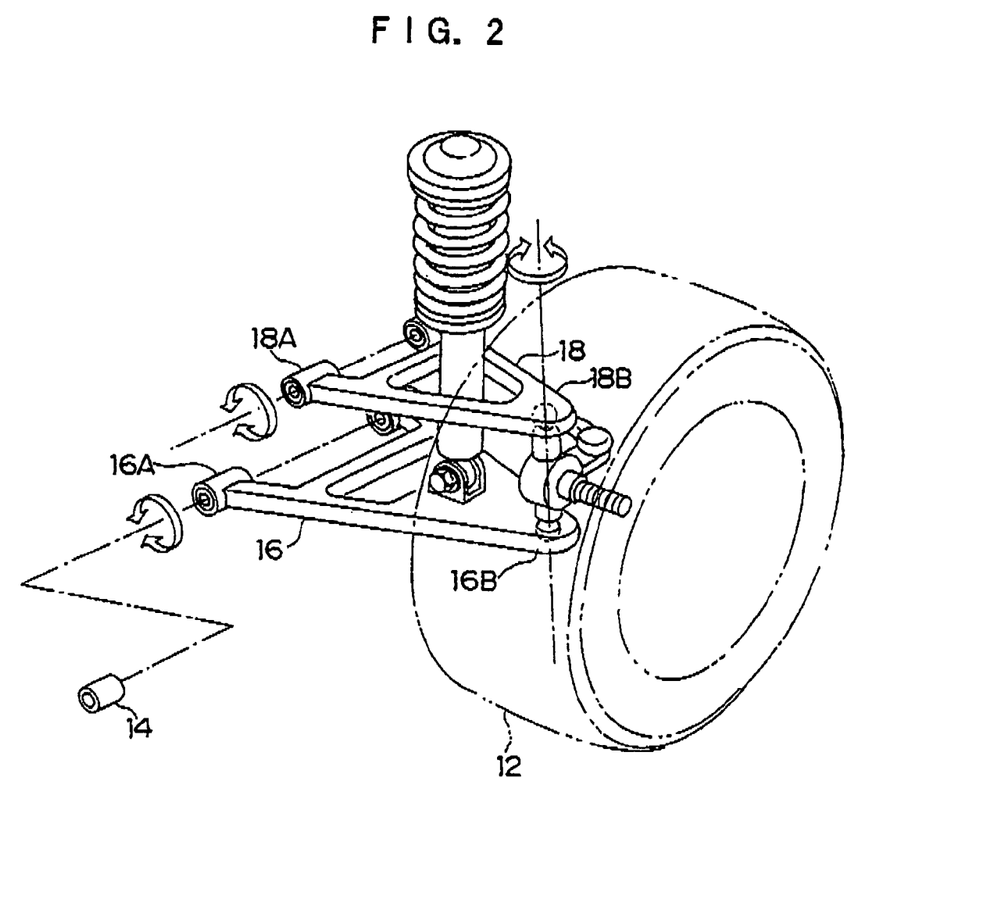
FIG. 2 is a perspective side view of the suspension.

As shown in FIG. 1, a vehicle 10 comprises a force sensor 14FR for detecting the force inputted from a front right wheel 12FR to a vehicle body (not shown), a force sensor 14FL for detecting the force inputted from a front left wheel 12FL to the vehicle body, a force sensor 14RR for detecting the force inputted from a rear right wheel 12RR to the vehicle body, and a force sensor 14FL for detecting the force inputted from a rear left wheel to the vehicle body.

In the present embodiment, the force sensor 14FR, the force sensor 14FL, the force sensor 14RR, and the force sensor 14RL are provided in portions of the suspensions that are subjected to a lateral force, respectively.

For example, in the front wheels, the force sensor can be provided in a ball joint supporting part in a tip end portion of the lower arm in the suspension, or in a bearing part, a bush part, or the like, in a mounting part of the lower arm to the vehicle body (for both the front wheel and the rear wheel).

In addition, depending upon the location of a supporting point, for the front wheel, the force sensor can be provided at a tie rod end of a steering portion, and for the rear wheel, the force sensor can be provided at an end portion of a toe control arm (suspension arm).

Figure 3:
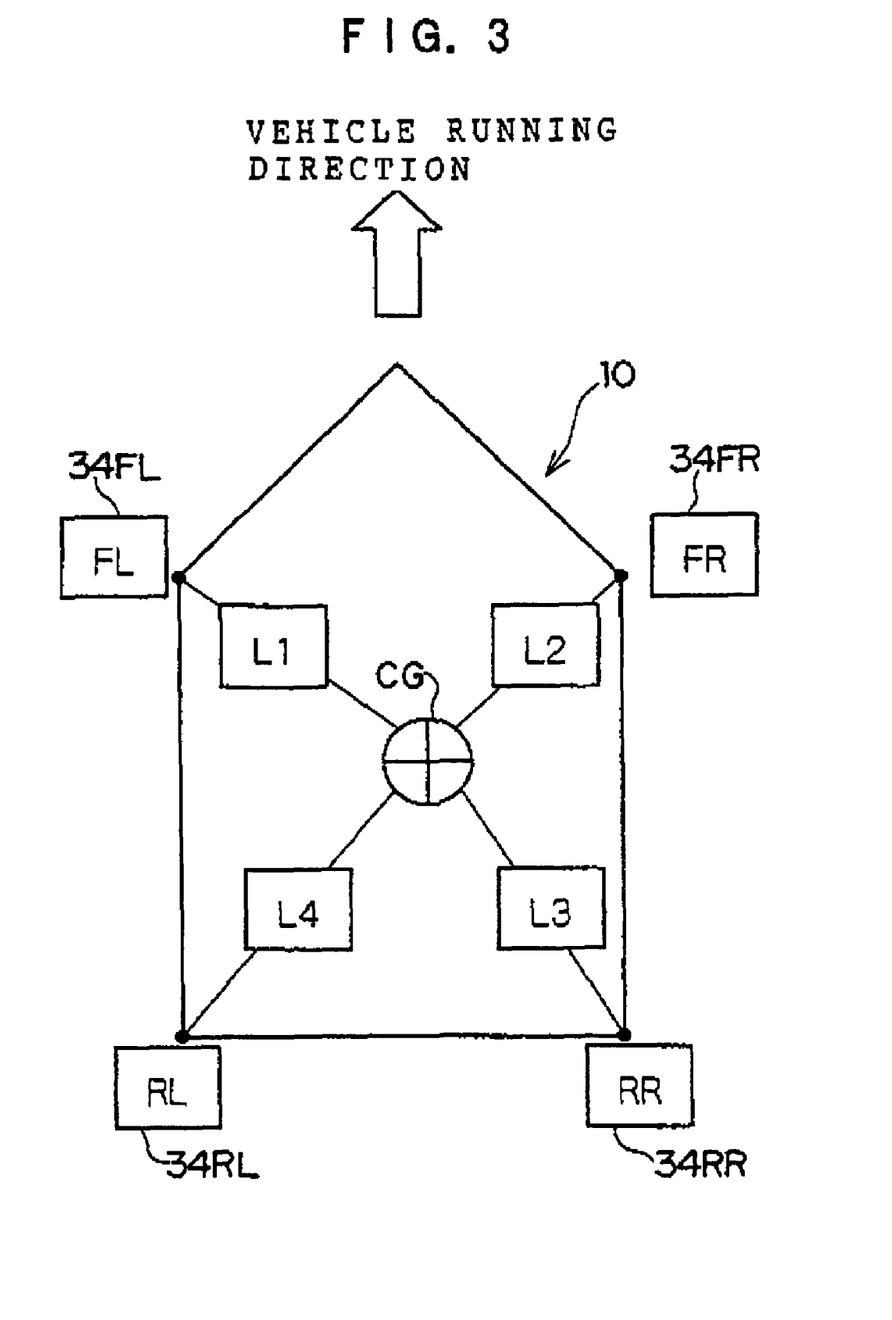
FIG. 3 is an explanatory drawing illustrating the moment acting on the vehicle.

Each of the force sensors 14 may be incorporated into a suspension component, or as shown in FIG. 3, a cylindrical force sensor 14 which is provided with a directivity in the direction of force input may be disposed in a bushing mounting portion 16A or a ball joint mounting portion 16B of a lower arm 16, a bushing mounting portion 18A or a ball joint mounting portion 18B of an upper arm 18, or the like, Examples of these force sensors include a strain gage for converting a displacement of a component part into an electric signal, or a piezoelectric device for signalizing a deformation, or an element which is changed in resistance, depending upon the deformation, or the like, In the present embodiment, the force sensor is used to detect a lateral force (a force in the lateral direction of vehicle), however, it may be provided so as to detect an input in the back and force direction or the vertical one with respect to the running direction of the vehicle.

As shown in FIG. 1, the force sensor 14FR, the force sensor 14FL, the force sensor 14RR, and the force sensor 14RL are connected to an analyzing apparatus 20.

The analyzing apparatus 20 corresponds to analyzing computation means, a first memory device, and a second memory device of the present invention, being constituted by a microcomputer having a CPU, an ROM, and an RAM, and the like.

In the analyzing apparatus 20, a display device 22 for displaying the result of analysis, and the like; an output device 24 for outputting the result of analysis, and the like; and an input device 26 for operation of the analyzing apparatus 20, and inputting a variety of pieces of information.

In a memory device 28 of the analyzing apparatus 20, various storage areas are provided, comprising at least two first storage areas and second storage areas corresponding to the first memory device and the second memory device of the present invention.

To the analyzing apparatus 20, a transmitter-receiver 32 (such as a mobile phone, a computer wireless LAN, or the like) which can wirelessly transmit the result of analysis, and the like may be connected. The result of analysis, and the like, can be transmitted to, for example, a dealer, a repair shop, a vehicle manager, or the like, through a wireless network, or the like.

(Operation)

Next, an example of way of using the vehicle state analyzing system of the present embodiment will be described.

In the vehicle state analyzing system of the present embodiment, the running stability of the vehicle 10 is capable of being analyzed.

The measure for analyzing the running stability of the vehicle 10 is not the magnitude itself of the input from the road surface, but the fluctuation of the force or the fluctuation rate, and by analyzing the fluctuation of the force or the fluctuation rate, the analysis is possible.

In the present embodiment, by applying the standard deviation for the lateral force to the following equations (1) and (2) (which are previously stored in the analyzing apparatus 20) to determine the moment Mo around the center of gravity CG of the vehicle 10, and compare it with the value when the vehicle 10 is run in an optimum state for a certain period of time, changes in air pressure of the tire and state of the suspension/chassis are detected, and the result of detection can be displayed.

First, the input from the road surface has a component which directly has no great effect on the running stability of the vehicle 10 and a component which directly has a great effect thereon, and it is necessary to separate these from each other. Such separation can be achieved by delimiting the frequencies.

Herein, the fluctuation in input that is generated at 15 Hz or higher has been specified to be the object For the vehicle 10, the air pressure for the respective tires is adjusted to an optimum value, with the suspension/chassis being adjusted to an optimum state by using an alignment tester, or the like.

Adjustments for creation of optimum states as those of the respective wheels and the vehicle can be carried out, for example, in accordance with the present inventors application (Japanese Patent Application Laid-Open (JP-A) No. 2000-062039) or, the adjustments can be carried out in accordance with the present inventor's application (Japanese Patent Application Laid-Open (JP-A) No. 10-7013) with using an apparatus which can input the similar output fluctuation.

Next, the system is set for the initialize mode; the vehicle 10 tuned for an optimum state is run straight, for example, on a flat road surface for a certain period of time with the steering wheel being held truly straight; and the information about the output of the respective force sensors is stored in the first storage area as the reference value. Thereafter, the system is switched over to the monitor mode for always monitoring the state of the vehicle 10 during running, however, alternatively, the state of the vehicle 10 during running may be compared at intervals.

The storage of information as mentioned here refers to storing the amount (magnitude) of force and the direction of force (including the time series change) on a time series basis; storing the mean value of the force when running has been made for a certain period of time; storing the fluctuation of the force when running has been made for a certain period of time; and storing the fluctuation rate of the force when running has been made for a certain period of time; and the like, however, the object to be stored may be the output of the respective force sensors that has been variously processed, provided that it is related to the output of the respective force sensors.

In the present embodiment, the data sorted by frequency is delimited by a certain period of time, for example, 10 to 30 sec for around 40 km/h, 5 to 10 sec for around 100 km/h, and the like (the data processing interval may exceed the above-mentioned range); the inputs around the center of gravity CO for the vehicle 10 are computed relating to the periods; and for the result, the standard deviation is determined (the processing may be carried out by primarily differentiating or quadratically differentiating the original data, however, in this case, it is necessary to give a sum of squares).

The yaw moment Mo depending on the state of the inputs and the disturbance when the vehicle 10 as shown in FIG. 3 is running can be expressed by the following equation (1), and further the change in stability (dM) can be expressed by the following equation (2).

$$Mo = F(Fl) \times L1 - F(Fr) \times L2 + F(Rr) \times L3 \times F(Rl) \times L4 \qquad \text{Eq. (1)}$$

$$dM = STDEV(Mo\,(A))/STDEV(Mo\,(B)) \qquad \text{Eq. (2)}$$

where F (Fl), F (Fr), F (Rr), and F (Rl) are the standard deviation of the fluctuation of the respective inputs for the front left wheel 12FL, the front right wheel 12FR, the rear right wheel 12RR, and the rear left wheel 12RL (for example, the standard deviation is determined by measuring the lateral force every 0.20 sec, and taking the amount of fluctuation of the lateral force as the observed value).

L1 is the distance from the center of gravity CG to the force sensor 14FL for the front left wheel; L2 is the distance from the center of gravity CG to the force sensor 14FR for the front right wheel; L3 is the distance from the center of gravity CO to the force sensor 14RL for the rear left wheel; and L4 is the distance from the center of gravity CG to the force sensor 14RR for the rear right wheel.

STDEV (Mo (B)) is the standard deviation in the initialized mode for the vehicle 10 that suspension/chassis is set to be an optimum state, and STDEV (Mo (A)) is the standard deviation for the vehicle 10 in the monitor mode.

Hereinbelow, the results of the experiment carried out with the use of a passenger car having an engine displacement of 1800 cc that are processed by using the above equations are given.

Figure 4A:
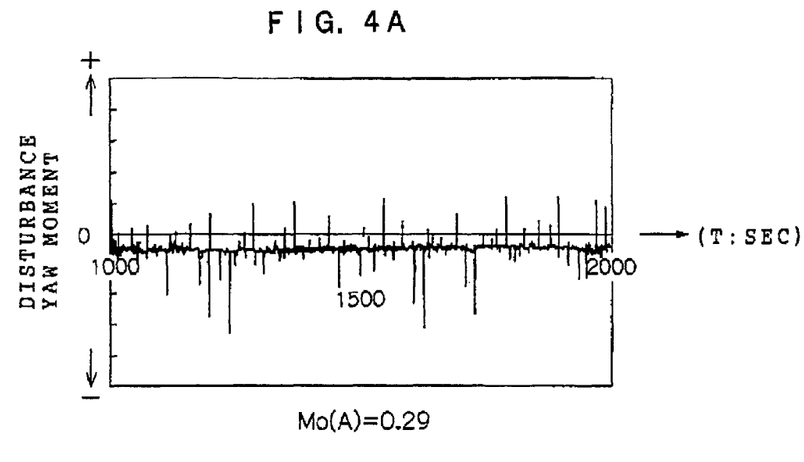
FIG. 4(A) provides data when the toe angle is A deg.
Figure 4B:
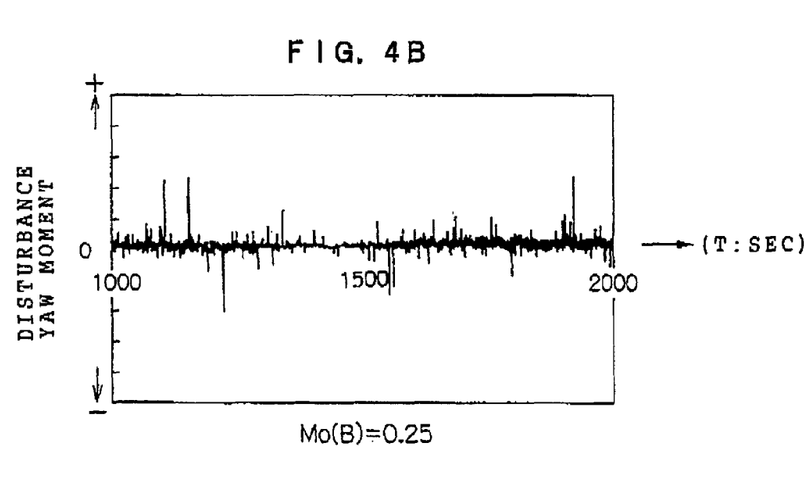
FIG. 4(B) provides data when the toe angle is B deg.

FIG. 4(A) shows a change in disturbance yaw moment (the abscissa gives time) for the vehicle 10 (having a toe angle of A deg) (on a speedway at 100 km/h, the embodiment side), and FIG. 4(B) shows a change in disturbance yaw moment (the abscissa gives time) for the vehicle 10 that is set to be an optimum state (having a toe angle of B deg). The positive side of the ordinate in the graph as shown in FIG. 4 denotes the moment in a clockwise direction, while the negative side thereof the moment in a counterclockwise direction.

In this experiment, dM=STDEV (Mo (A))/STDEV (Mo (B)) (0.29/0.25 (1.16 is obtained.

From FIG. 4(A), and FIG. 4(B), it can be seen that the fluctuation in course of the vehicle 10 due to the disturbance inputs in a case of a toe angle being A deg obviously differs from that in a case of a toe angle being B deg, and the stability for a toe angle of B deg is higher.

Hereinbelow, the driver's evaluation (on a 0 to 10 point scale evaluation) in the experiment is given.

TABLE 1

|  | Toe angle A deg | Toe angle B deg |
|---|---|---|
| Score | 7.0− | 7.0 |
| Comment | It seems car is difficult to be affected by the irregularities of road surface, but is slightly susceptible to lateral wind. Score is slightly below 7.0. | Car is difficult to be affected by the irregularities of road surface. It gives a good running stability with less disturbance. |

Herein, an example in which the toe angle is changed has been given, however, also when any other mounting angle, such as the camber angle, or the like, is changed, the moment is changed in the same manner.

In addition, if any one of all the wheels is changed in mounting angle, the moment is changed in the same manner, and thus the change in state of the vehicle 10 can be grasped.

Next, the results of the same test conducted for the vehicle 10 in which air is exhausted from one wheel of all the wheels will be given.

It is understood that, as the air pressure for a tire is decreased, the rigidity of the tire supporting the vehicle 10 is changed, and thus the balance among the inputs from the respective wheels is changed, resulting in change in yaw moment around the center of gravity CG for the vehicle.

Figure 5A:
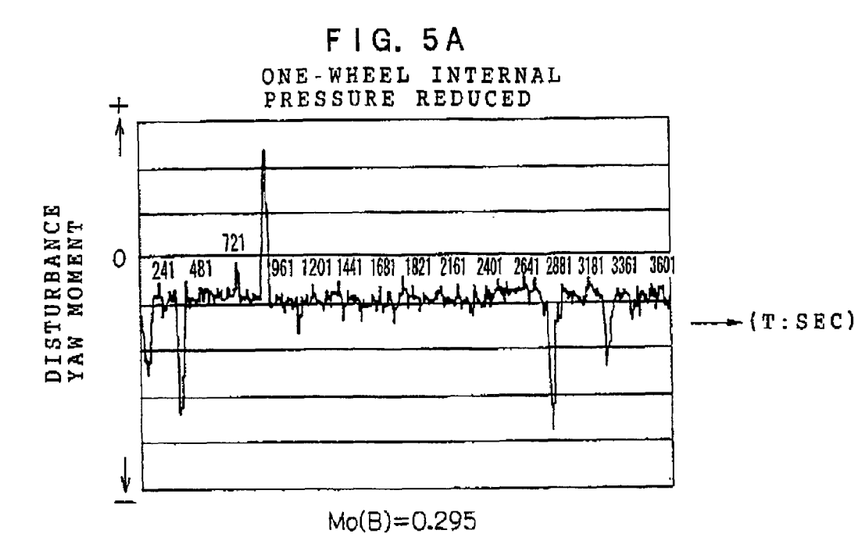
FIG. 5(A) provides data when the internal pressure for one wheel is reduced.
Figure 5B:
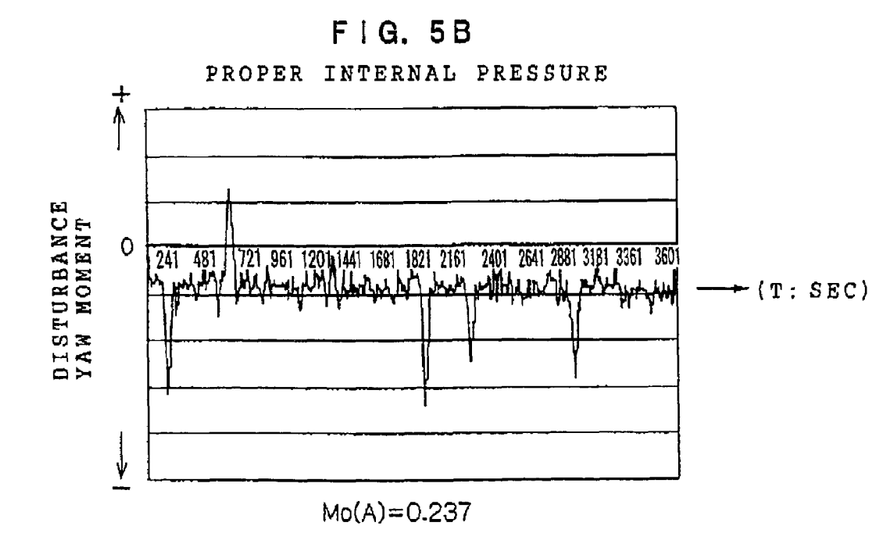
FIG. 5(B) provides data when a proper internal pressure is given.

FIG. 5(A) gives data when the internal pressure for one wheel is reduced (to 90 kPa) (on a general road at a speed of 30 to 50 km/h), while FIG. 5(B) data when all wheels have a proper internal pressure (190 kPa).

In this experiment, dM (STDEV (Mo (A))/STDEV (Mo (B)) (0.295/0.237 (1.24 is obtained.

By examining not only the moment, but also the change in input for each wheel, or comparing the inputs of the right and left wheels, which wheel the mounting angle has been displaced or which wheel the internal pressure is abnormal is also made possible to be grasped.

In the present embodiment, the information stored in the analyzing apparatus 20, such as the stored contents, the result of analysis, and the like, can be taken to the outside through the output device 24. Therefore, the information can be analyzed, and saved for management by use of an external computer.

In addition, in the present embodiment, the result of analysis, or the like, can be displayed on the display device 22.

Specifically, the system is set to issue an alarm when the fluctuation (dM (RMS)) exceeds 18%.

When the dM (RMS) value reaches the alarm criterion which is set, and this state continues for a certain period of time (5 min, for example), the analyzing apparatus 20 determines that the above-mentioned problem (such as a lowered internal pressure, a change in wheel mounting angle, or the like)occurs in the vehicle 10, and can display a message, such as "Suspension/chassis balance is being unstable, or tire air pressure is being abnormal. Stop running, and check for safety.", or the like, on the display 22.

The display device 22 may be a dedicated item, a display provided oh the instrument panel for the driver's seat, a monitor in the navigation system, or the like. When the display device 22 is not a dedicated item, it is preferable that, when a problem occurs, an interrupt indication be given. When a problem occurs, an alarm sound may be issued at the same time.

In addition, from the transmitter-receiver 32, such as a mobile phone, or the like, connected to the output device 24, the result of analysis, the alarm, or the like, may be transmitted to the dealer, the repair shop, the manager of the vehicle 10, and the like.

The output device 24 may be connected to a system which performs information transmission to the dealer, the manager of the vehicle 10, the nearest repair shop, and the like, as well as guidance to the nearest facility which can make repair, the nearest relief facility, or the like, through the wireless network.

According to the present embodiment, the input from the wheel is referenced, thus even when the tire or suspension/chassis is replaced, recalibration can be carried out to provide an optimum state according to the suspension/chassis as the reference.

A change in behavior of the vehicle due to a change in alignment can also be monitored, thus a time dependent change of the suspension, and a possibility of the wheel mounting state being changed by rough road running can be detected for promotion of repair.

The phenomenon which occurs when the tire internal pressure is lowered or varied with respect to that at the time of setting can be detected as a change in wheel behavior, thus a change in internal pressure can be grasped as a reduction in running stability due to a change of the suspension/chassis, and alarm can be given.

Because the respective force sensors are incorporated in the ball joint or the suspension arm bushing which can be incorporated as a suspension fitting equipment, there is no need for a special power supply, a transmitting-reception apparatus, and the like.

This vehicle state analyzing system may be connected to the alignment adjustment apparatus for the vehicle for exchange of information.

For example, this vehicle state analyzing system can also be combined with the application (Japanese Patent Application Laid-Open (JP-A) No. 2000-062039) of the present inventor for managing, monitoring, setting, and correcting the information pertaining to the running stability of the vehicle 10.

Second Embodiment

Next, a second embodiment of the present invention will be described hereinbelow. The same component as in the first embodiment will be provided with the same sign, and the description thereof will be omitted.

The present embodiment is provided with a function which, when there occurs a problem with the state of the vehicle 10, automatically corrects the state to an optimum one on the basis of the result of analysis.

Figure 6:
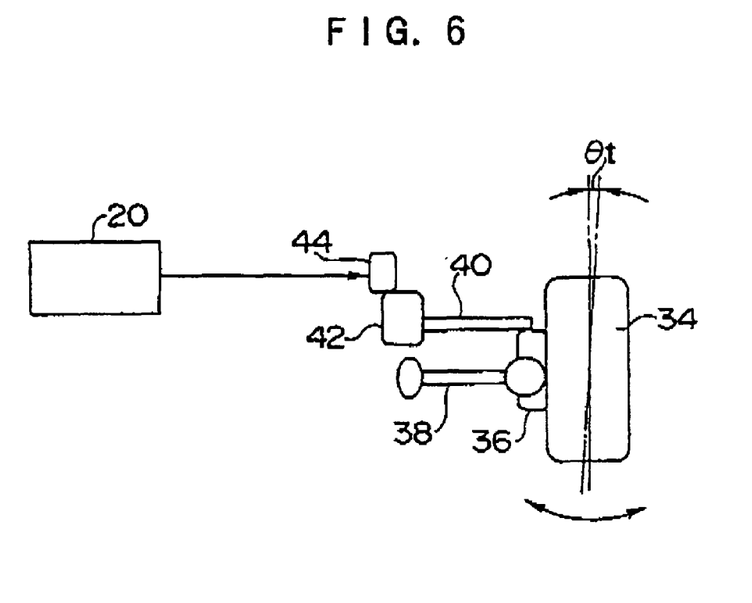
FIG. 6 is a plan view of the suspension.
Figure 7:
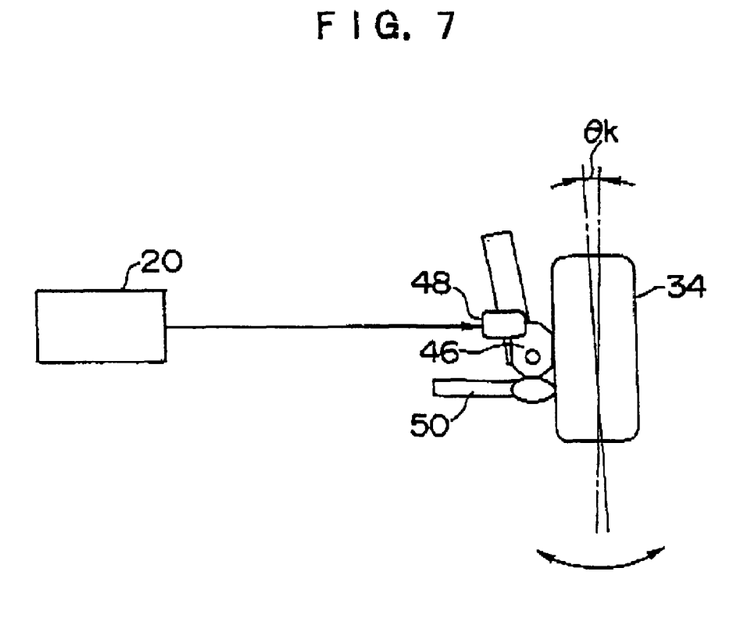
FIG. 7 is a front view of the suspension.

FIG. 6 and FIG. 7 schematically show the suspension for the vehicle 10.

In FIG. 6, which is a plan view of the suspension, the sign 34 indicates a tire, the sign 36 a knuckle, the sign 38 a camber control arm, the sign 40 a toe control arm, sign 42 a cam bracket holding an eccentric cam (not shown) for toe angle (θt) adjustment, and the sign 44 an angle adjusting motor for turning the eccentric cam.

In addition, in FIG. 7, which is a front view of the suspension, the sign 46 indicates a cam bracket holding an eccentric cam (not shown) for camber angle (θk) adjustment, and the sign 48 an angle adjusting motor for turning the eccentric cam, the sign 50 a lower arm.

Herein, the angle adjustment motor 44, and the angle adjustment motor 48 are configured such that rotations thereof are controlled by the analyzing apparatus 20.

In the above-mentioned first embodiment, when an alarm is displayed on the display device 22, the driver, or the like, will request adjustment of the suspension/chassis for the vehicle 10, or filling the tires with air of the dealer, the repair shop, or the like, however, in the present embodiment, the fluctuation (dM (RMS)) can be monitored to adjust the toe angle and the camber angle such that the value of fluctuation does not exceed 18%, for example, and preferably is close to zero.

When the camber angle, and the toe angle are automatically adjusted, a display of "Camber angle automatically adjusted.", "Toe angle automatically adjusted.", or the like, may be given.

In addition, in a case in which the adjustment ranges for the camber angle and the toe angle are previously set, and when the camber angle and/or the toe angle exceeds the adjustment ranges, it can be considered that the state of the vehicle 10 has become worse due to some other factor, such as air pressure, or the like, thus in such a case, it is recommended to issue an alarm on the display device 22.

This vehicle 10 can also address the problem of running stability related to the wheel mounting angle, as well as the time dependent change of the suspension/chassis, and the change in adjustment of the suspension/chassis, and can maintain the running stability in the straight running state.

The force sensor 14FR, the force sensor 14FL, the force sensor 14RR, and the force sensor 14RL, the analyzing apparatus 20 (corresponding to the analyzing computation means, the first memory device, and the second memory device of the present invention), the display device 22 for displaying the result of analysis, or the like, the output device 24 for outputting the result of analysis, or the like, to the outside, and the adjusting means for automatically adjusting the alignment of the suspension may be provided in the vehicle, respectively, or outside the vehicle, for example, in a shop, or the like.

For example, the force sensor 14FR, the force sensor 14FL, the force sensor 14RR, and the force sensor 14L, the analyzing apparatus 20 (corresponding to the analyzing computation means, the first memory device, and the second memory device of the present invention), the display device 22 for displaying the result of analysis, or the like, the output device 24 for outputting the result of analysis, or the like, to the outside, and the adjusting means for automatically adjusting the alignment of the suspension may all be provided outside the vehicle (which is a first pattern); only the force sensor 14FR, the force sensor 14FL, the force sensor 14RR, and the force sensor 14RL, the second memory device in the analyzing apparatus 20 may be provided in the vehicle, the others being provided outside the vehicle (which is a second pattern); only the force sensor 14FR, the force sensor 14FL, the force sensor 14RR, and the force sensor 14RL, the first memory device and the second memory device in the analyzing apparatus 20 may be provided in the vehicle, the others being provided outside the vehicle (which is a third pattern); the force sensor 14FR, the force sensor 14FL, the force sensor 14RR, and the force sensor 14RL, the analyzing apparatus 20 (corresponding to the analyzing computation means, the first memory device, and the second memory device of the present invention), and the output device 24 for outputting the result of analysis, or the like, to the outside may be provided in the vehicle, the others being provided outside the vehicle (which is a fourth pattern); the adjusting means for automatically adjusting the alignment of the suspension may be provided outside the vehicle, the others being provided in the vehicle (which is a fifth pattern); the force sensor 14FR, the force sensor 14FL, the force sensor 14RR, and the force sensor 14RL, the analyzing apparatus 20 (corresponding to the analyzing computation means, the first memory device, and the second memory device of the present invention), the display device 22 for displaying the result of analysis, or the like, the output device 24 for outputting the result of analysis, or the like, to the outside, and the adjusting means for automatically adjusting the alignment of the suspension may all be provided in the vehicle (which is a sixth pattern); and the force sensor 14FR, the force sensor 14FL, the force sensor 14RR, and the force sensor 14RL, and a transmission apparatus (not shown) which transmits the information obtained with the respective force sensors wirelessly, or otherwise, to the outside of the vehicle may be provided in the vehicle, the other components being provided outside the vehicle (which is a seventh pattern).

Between the vehicle and the outside thereof (for example, a shop), data exchange can be carried out with a mobile phone, a car navigation having a communication capability, or the like.

Whether the respective components, such as the force sensor 14FR, the force sensor 14FL, the force sensor 14RR, and the force sensor 14RL, the analyzing apparatus 20, the display device 22, the output device 24, the adjusting means for automatically adjusting the alignment of the suspension, and the like, are to be provided on the shop side or on the vehicle side can be selected as appropriate, and if the number of components which are mounted in the vehicle is decreased, the cost burden on the driver (user) side can be reduced.

INDUSTRIAL APPLICABILITY

As described above, the vehicle state analyzing system, the vehicle, and the vehicle state management system pertaining to the present invention can be advantageously used in analyzing the state of the vehicle.

What is claimed is:

1. A vehicle state analyzing method, comprising:
   a suspension/chassis setting step for setting an optimum alignment state in a suspension/chassis of a vehicle;
   an initialize mode measuring step in which a lateral force from all wheels to a vehicle body is measured, by using a force sensor for detecting input of force from each wheel to the vehicle body, when the vehicle, which is set to an optimum alignment state, is run on a substantially flat road surface as reference under a predetermined condition, and deviation of fluctuation or fluctuation rate of the lateral force with respect to the optimum alignment state is measured;
   a monitor mode measuring step in which the lateral force is measured, by using the force sensor, when the vehicle, which has run a predetermined distance or for a predetermined time from a time of performing the initialize mode measuring step, is run on a substantially flat road surface, and deviation of fluctuation or fluctuation rate of the lateral force with respect to the optimum alignment state is measured; and
   an analyzing step in which a change of the alignment state of the vehicle is analyzed on the basis of a ratio of the deviation obtained at the monitor mode measuring step and the deviation obtained at the initialize mode measuring step.

2. The vehicle state analyzing method of claim 1, wherein the deviation of fluctuation or fluctuation rate of the lateral force is measured during normal running of the vehicle.

3. A vehicle state analyzing system for analyzing state of a vehicle having wheels, comprising;
   a force sensor for detecting input of force from a wheel to a vehicle body;
   initialize mode memory means in which a lateral force from all wheels to the vehicle body is measured, by using the force sensor for detecting input of force from each wheel to the vehicle body, when the vehicle, which is set to an optimum alignment state, is run during a first period on a substantially flat road surface as reference under a predetermined condition and deviation of fluctuation or fluctuation rate of the lateral force with respect to the optimum alignment state is measured, and stored;
   monitor mode memory means in which the lateral force is measured, by using the force sensor, when the vehicle, which has run a predetermined distance or for a predetermined time from a time of measuring the lateral force by the initialize mode memory means, is run, during a second period after the first period, on the substantially flat road surface and deviation of fluctuation or fluctuation rate of the lateral force with respect to the optimum alignment state is measured, and stored;
   analyzing computation means in which a change of the alignment state of the vehicle is analyzed on the basis of a ratio of the deviation stored in the monitor mode memory means and the deviation stored in the initialize mode memory means; and
   information output means for outputting at least one of the information stored in the initialize mode memory means, the information stored in the monitor mode memory means, and a result of the analysis obtained by the analyzing computation means.

4. The vehicle state analyzing system of claim 3, wherein the force sensor is provided in the vehicle, and
   the initialize mode memory means, the monitor mode memory means, the analyzing computation means, and the information output means are provided outside the vehicle.

5. A vehicle comprising:
   a vehicle state analyzing system mounted thereon, the system comprising:
      a force sensor for detecting input of force from a wheel to a vehicle body;
      initialize mode memory means in which a lateral force between from all wheels to the vehicle body is measured, by using the force sensor for detecting input of the force from each wheel to the vehicle body, when the vehicle, which is set to an optimum alignment state, is run on a substantially flat road surface as reference under a predetermined condition and deviation of fluctuation or fluctuation rate of the lateral force with respect to the optimum alignment state is measured, and stored;
      monitor mode memory means in which the lateral force is measured, by using the force sensor, when the vehicle, which has run a predetermined distance or for a predetermined time from a time of measuring the lateral force by the initialize mode memory means, is run on the substantially flat road surface and deviation of fluctuation or fluctuation rate of the lateral force with respect to the optimum alignment state is measured, and stored
      analyzing computation means in which a change of the alignment state of the vehicle is analyzed on the basis of a ratio of the deviation stored in the monitor mode memory means and the deviation stored in the initialize mode memory means; and
      information output means for outputting at least one of information stored in the initialize mode memory means, information stored in the monitor mode memory means, and a result of the analysis obtained by the analyzing computation means, is mounted.

6. The vehicle of claim 5 further comprising
   display means for displaying the state of the vehicle obtained by the analyzing computation means.

7. The vehicle of claim 5 further comprising
   adjustment means for automatically adjusting alignment of a suspension on the basis of the state of the vehicle analyzed by the analyzing computation means.

8. A vehicle state management system, comprising:
   a vehicle state analyzing system for analyzing state of a vehicle having wheels, comprising:
      a force sensor for detecting input of force from a wheel to a vehicle body;
      initialize mode memory means in which a lateral force from all wheels to the vehicle body is measured, by using the force sensor for detecting input of the force from each wheel to the vehicle body, when the vehicle, which is set to an optimum alignment state, is run on a substantially flat road surface as reference under a predetermined condition and a deviation of fluctuation or fluctuation rate of the lateral force with respect to the optimum alignment state is measured, and stored;
      monitor mode memory means in which the lateral force is measured, by using the force sensor, when the vehicle, which has run a predetermined distance or for a predetermined time from a time measuring the lateral force by the initialize mode memory means, is run on the substantially flat road surface and a deviation of fluctuation or fluctuation rate of the lateral force with respect to the optimum alignment state is measured, and stored;
      analyzing computation means in which a change of the alignment state of the vehicle is analyzed on the basis of a ratio of the deviation stored in the monitor mode memory means and the deviation stored in the initialize mode memory means; and
      information output means for outputting at least one of information stored in the initialize mode memory means, information stored in the monitor mode memory means, and a result of the analysis obtained by the analyzing computation means; and
   a vehicle testing apparatus having the substantially flat road surface for running which causes the wheels to be rotated, detecting the state of the vehicle from outside, and being capable of storing the state of the vehicle detected from the outside and the state of the vehicle analyzed by the vehicle state analyzing system.

* * * * *